May 31, 1927.

L. J. SPENCE

FREIGHT CAR CONSTRUCTION

Filed Oct. 30, 1924

Inventor
Lewis J. Spence,
Attorney

May 31, 1927.
L. J. SPENCE
1,630,868
FREIGHT CAR CONSTRUCTION
Filed Oct. 30, 1924     4 Sheets-Sheet 2
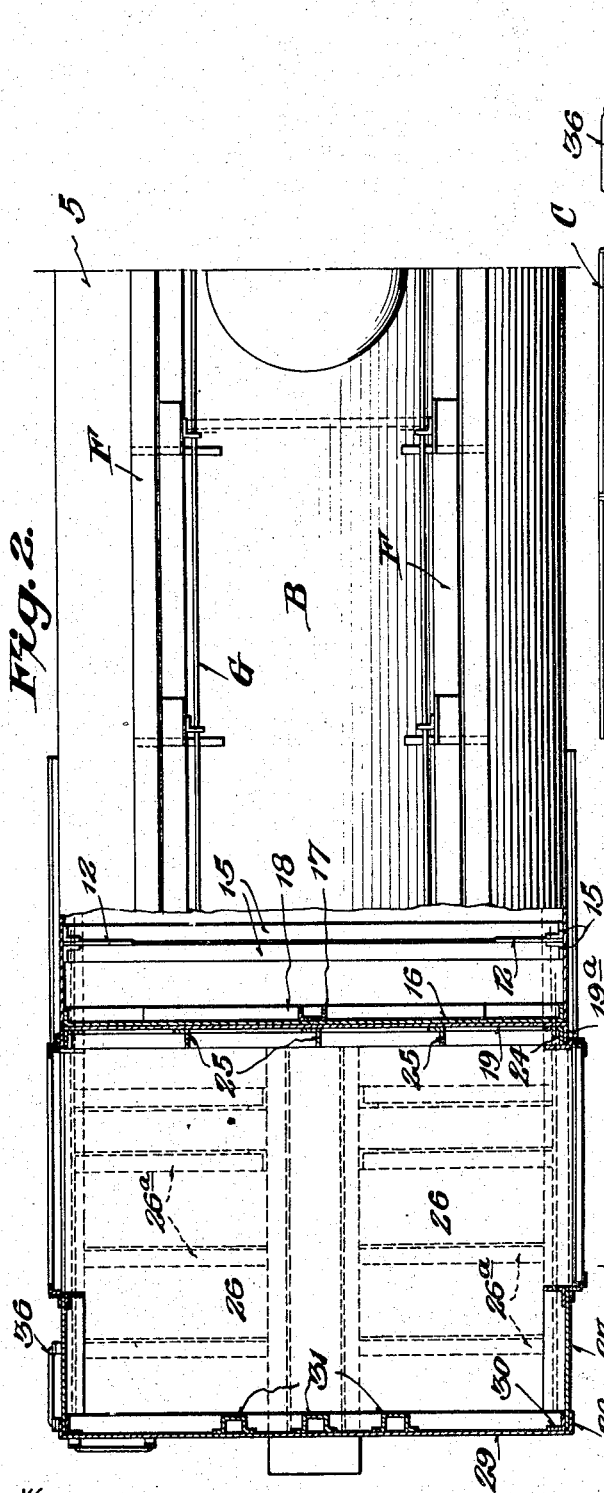
Inventor
Lewis J. Spence,
By
Attorney

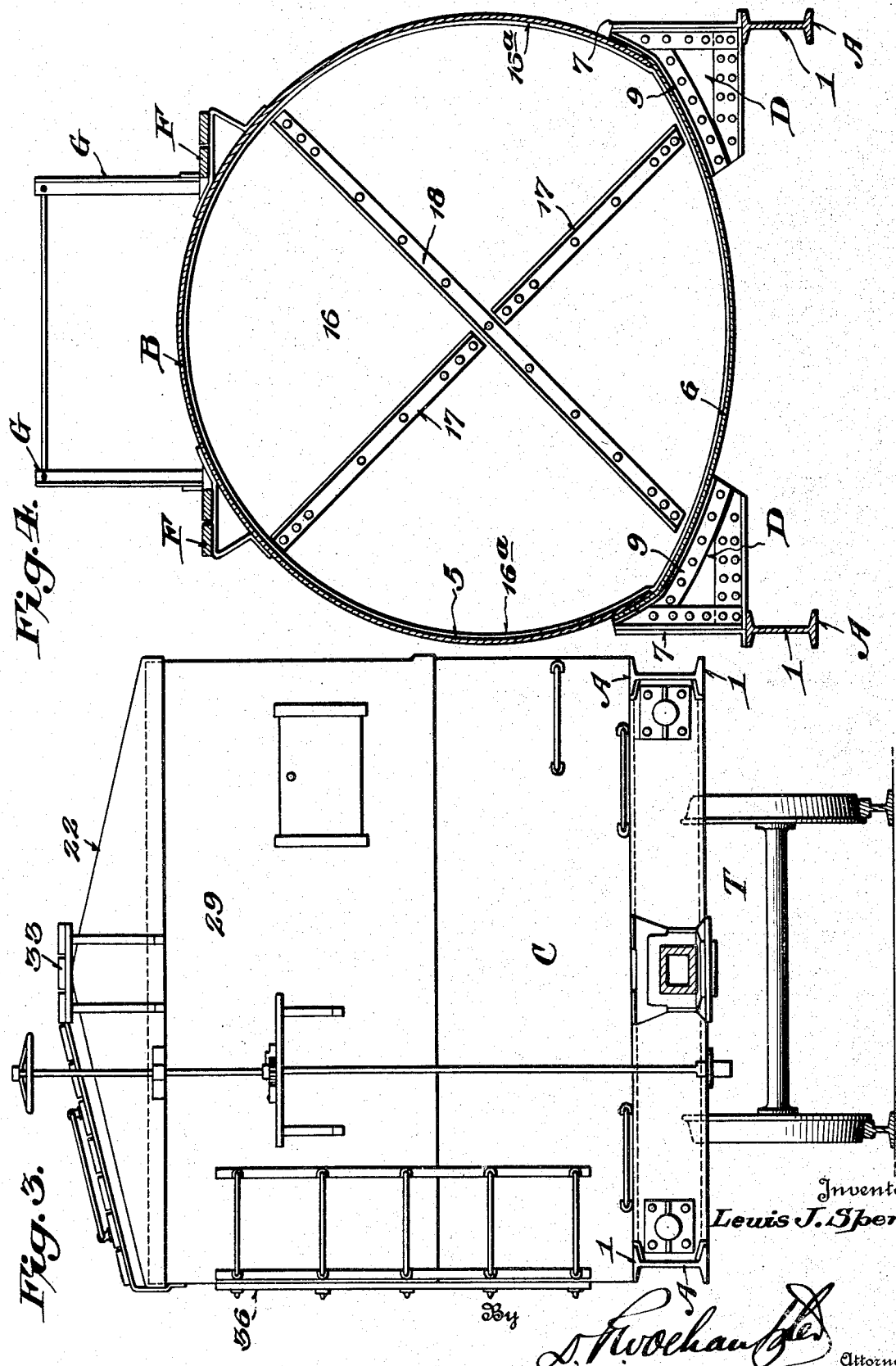

May 31, 1927.
L. J. SPENCE
1,630,868
FREIGHT CAR CONSTRUCTION
Filed Oct. 30, 1924    4 Sheets-Sheet 4
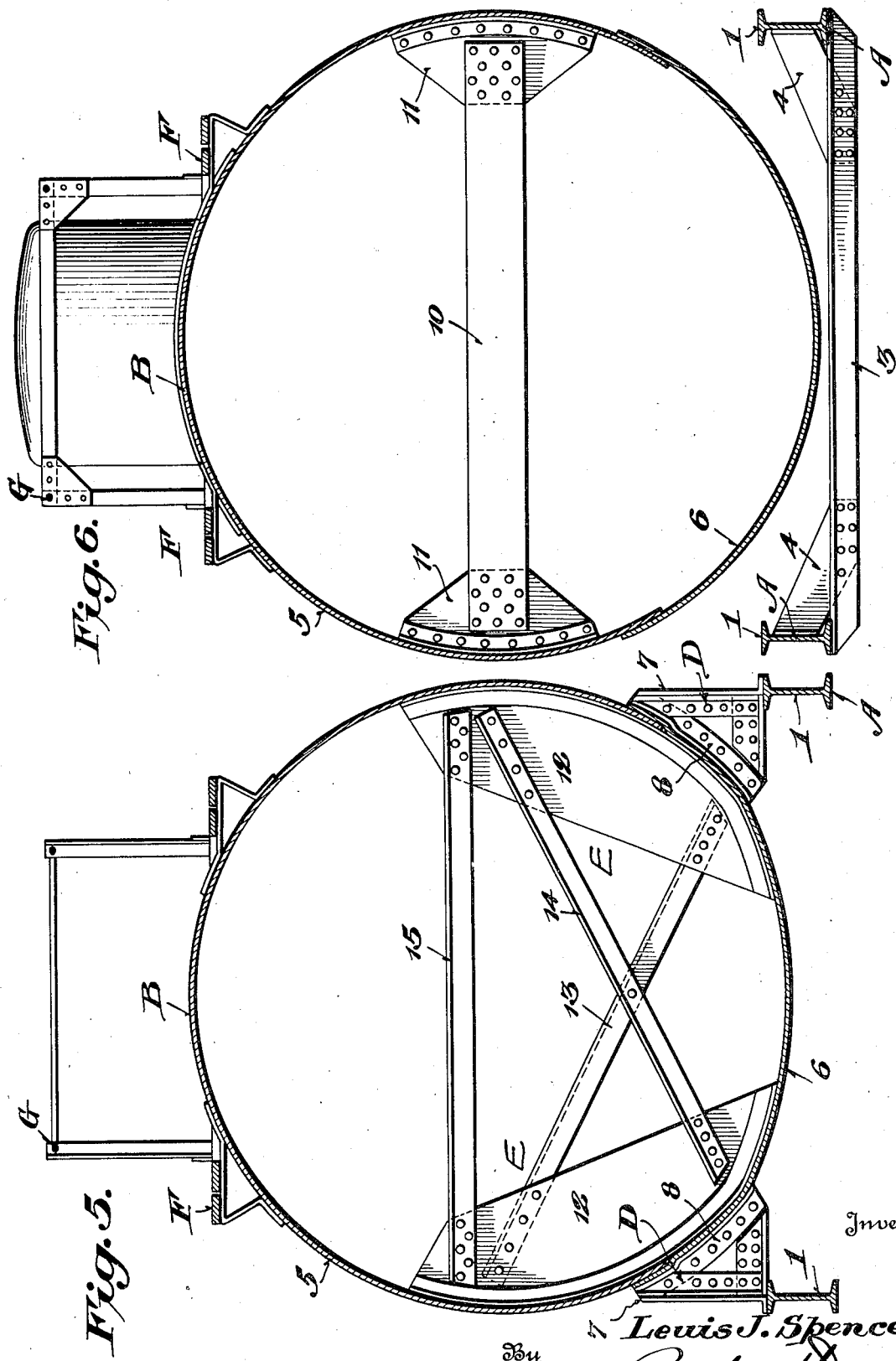
Inventor
Lewis J. Spence,
By
Attorney Patented May 31, 1927.

1,630,868

UNITED STATES PATENT OFFICE.

LEWIS J. SPENCE, OF BROOKLYN, NEW YORK.

FREIGHT-CAR CONSTRUCTION.

Application filed October 30, 1924. Serial No. 746,850.

This invention relates to a freight car construction, and more particularly to an improvement in combination tank and box cars for transporting such commodities as oil, as well as dry freight, and thereby obviating idle runs and permitting of consolidated mixed shipments when desired.

Accordingly, the present invention has generally in view a car particularly designed to provide a maximum tank capacity, substantially equivalent to that ordinarily used, at the same time providing comparatively commodious full height supplementary cargo compartments for carrying and transporting other freight required to be shipped in closed cars.

A specific object of the invention is to provide a novel tank construction which is adequately braced to sustain and distribute the loading strains incident to the shipments of heavy fluid, such as oil. That is to say, it is proposed to provide a consolidated oil and cargo car construction in which the tank may be kept at normal diameter at its medial portion and specially constructed at the ends, thereby making it possible to utilize standard tank features with consequent greater capacity in a combined tank and box car construction.

As a further object the invention contemplates making the supplementary cargo compartments of usual dimensions as to height and width thereby making it possible to transport commodities usually shipped in cars of the box freight-car type.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a side elevation of the improved car construction, the same being partly in section to illustrate the interior tank reinforcing means and the interior of one of the cargo compartments.

Figures 2 and 2ª are complemental top plan views of the improved car construction, Figure 2 being partly in horizontal section to illustrate the parts also shown in section in Figure 1.

Figure 3 is an end elevation of the car.

Figure 4 is a vertical sectional view taken on the line 4—4 of Figure 1.

Figure 5 is a vertical sectional view taken on the line 5—5 of Figure 1.

Figure 6 is a vertical sectional view taken on the line 6—6 of Figure 1.

Similar reference characters designate corresponding parts throughout the several figures of the drawings.

In carrying the present invention into effect it is proposed to observe as closely as possible standard freight car requirements with reference to the under-frame or chassis thereby to keep construction cost within practical limits. Therefore, to that end it is proposed to use the chassis A which is of standard length and width, and mount on the medial portion thereof the oil tank B, while at the ends are located the cargo compartments C.

In the embodiment of the invention shown the chassis A includes in addition to the usual trucks and wheels, the side beams or sills 1 and the cross struts 2 and 3, the same being arranged at proper intervals to give the required strength and stiffness to the frame or chassis. The cross struts are preferably made from pairs of stiffening angles turned back-to-back and are carried by the underside of the side sills 1 thereby to provide clearance for the intermediate part of the tank B which is of maximum diameter at this part of the frame. As shown in Figure 6 the said cross struts 3 are also connected with the webs of the sills 1 by the braces 4.

The tank B preferably consists of a cylindrical shell formed by the top and bottom sections 5 and 6, and the central part of the tank is circular, but at the ends, the lower half thereof is made elliptical as shown in Figure 5, and the bottom plate 6 is therefore inclined upwardly at the ends as indicated at 6ª in Figure 1. In that way the bottom ends of the tank are brought up to the level of the floor of the cargo compartments C thus clearing truck frames and wheels T. As will be observed from Figures 1 and 5 the ends of the tank are supported in built-up saddles D which rest upon the upper flanges of the sills 1, and include the plates 7 and spaced bearing seats 8 and 9 which may consist of angle members arranged in substantially triangular formation to adequately support and brace the relatively flattened ends of the bottom of the tank. The interior of the tank is provided with the center cross ties 10 whose opposite ends are secured to the anchor plates 11 securely fastened to the inside of the upper shell 5, and the ends of the tank are securely braced and strengthened by the special reinforcing units E. These units consist of the segmental gusset plates 12 which span the joint between the sections 5 and 6, and are connected by the braces 13 and 14 arranged in lattice truss formation, and also by the upper tie member 15 as clearly shown in Figure 5.

The end walls of the tank B are preferably formed by suitable plates 16 as will be observed from Figs. 1 and 4, and these plates are adequately reinforced by the angle irons 17 and 18 fitted to the inside face of the wall thereby to prevent buckling or warping of the plate or sheet. As will also be observed from Figs. 1 and 4 the end sheet 16 is provided with a flange 16$^a$ for telescopically fitting within the open end of the tank B, thereby permitting of making a fluid-tight joint between the end sheet and the top and bottom sections 5 and 6 of the tank. The outer upper side of the tank may be provided with the foot-ways F which may be provided with the hand-holds or guard structure G.

The enclosed storage or box-compartments C are formed directly at and against the ends of the tank B, and the wall adjacent the tank is preferably formed by a plate 19 flanged at its side edges as indicated at 19$^a$ (Fig. 2) and secured to the plate or sheet 16 and also offset at its upper end as indicated at 20 (Fig. 1) to provide for receiving the flange 21 of the top or roof 22 of the box compartment. At the junction of the flange 21, the top 22, and the wall 19 suitable reinforcing bars 23 may be used and the vertical flanges 19$^a$ of the sheet 19 may be provided with the angle members 24 as shown in Figure 2. The intermediate portion of the sheet 19 may be fitted with the intermediate vertical stiffening angles 25, as also shown in Figures 1 and 2. The floor 26 of the compartment may be formed in any suitable manner, as for example, on the angle iron joist members 26$^a$, and the side walls may be formed by the plates 27 which fit into the flanges 28 of the end sheet 29. This end sheet may be made of upper and lower sections to facilitate assembly as shown in Figure 3. The joint between the side walls 27 and the end sheet 28 may be stiffened by the reinforcing angles 30 and the intermediate portion of the sheet 29 is preferably reinforced by the hollow vertical channel members 31. Also, the roof 22 is braced by the carlines 22$^a$ which are preferably of hollow or substantially channel formation to give the roof adquate strength for supporting the main foot-way 32, and the transverse footway 32$^a$ which leads to the footway F of the tank.

The side sheets 27 are made relatively narrow thereby to provide door-ways for obtaining access to the compartments and said door-ways are preferably closed by the sliding doors 33 which operate in conjunction with upper and lower track members 34 and 35 extending toward the tank B. This arrangement permits the doors to be shifted clear of the door-way and yet not interfere with the hand hold or ladder 36 carried by the outside of the plates 27.

From the foregoing it will be seen that the present construction provides a combined oil tank and box car construction wherein the oil tank is maintained at maximum intermediate diameter while the ends thereof are contracted and reinforced to more effectively distribute and carry the load and weight of the contents of the tank, while at the same time having the advantage of providing closed or sealed compartments for carrying cargo that must be protected or shipped under seal. Also the arrangement shown has the advantage of providing the box compartments at the ends of the tank, thereby protecting the tank to considerable extent from damage in case of collision.

Also by the arrangement shown longitudinal stresses caused by end buffing shocks and draw-bar pull will be transmitted through the side sills 1 rather than through the tank shell, thus affording a protection to the tank from shocks tending to open seams and cause leakage.

Other advantages will be readily apparent to those skilled in the art, and it will of course be understood that minor changes in form, proportion and the arrangement of parts may be resorted to without departing from the spirit of the invention or the scope of the appended claims.

I claim:—

1. A tank car including a tank of standard diameter having its longitudinal axis arranged lengthwise of the car and provided on the outside of its ends with supplemental cargo compartments of a height equal to the height of the tank.

2. A tank car including a tank of standard diameter having its longitudinal axis arranged lengthwise of the car and provided on the outside of its tank with a supplemental cargo compartment of a height equal to that of the tank and having closed side, end and top walls, and a door-way formed in said side walls.

3. A freight car construction including a chassis, means for supporting a cylindrical tank at the intermediate portion of the chassis, said tank being of standard diameter at the intermediate part and of constricted diameter at the ends, and inclosed cargo carrying compartments formed at the ends of the tank and conforming substantially to the height of the tank.

4. A freight car construction including a chassis, means for supporting a tank at the intermediate portion of said chassis, closed compartments formed on the chassis at the ends of the tank, and said tank comprising a body of standard diameter at its medial portion and of less diameter at its ends where it joins with the end compartments, and means for bracing the interior of the tank at its central portion and adjacent the ends thereof.

5. A freight car construction including a chassis, means for supporting a tank at the intermediate portion of the chassis, inclosed cargo compartments of the same height as the tank formed at the end of the chassis, the end walls of the tank and inside walls of the compartments being formed by plates secured together, reinforcing angles carried by the inside face of the plate forming the end of the tank, and other reinforcing elements carried by the exposed face of the plate forming the inside of the compartment.

6. A freight car construction including a chassis including side sills and cross beams, the cross beams at the intermediate part of the chassis being arranged below the plane of the sills thereby to provide tank clearance, bolsters carried by the side sills, a tank supported in said bolsters and having its intermediate portion extending down into the said tank clearance while the ends thereof lie substantially in the same plane as the tops of the sills, transverse interior cross ties at the center of the tank, reinforcing units formed in the tank adjacent the end walls thereof, reinforced end walls for said tank, and inclosed cargo compartments formed on the chassis and of the same height as the tank, one wall of the compartments being formed by one end of the tank.

7. A freight car construction including a chassis having means for supporting a tank, inclosed cargo compartments of the same height as the tank and arranged at the ends thereof and having door-ways, doors for said door-ways, and track-ways for slidably supporting the doors, said track-ways extending from the zone of the door-ways into the zone of the tank whereby said doors may be shifted toward the tank to establish access to the compartment.

8. A freight car construction including a chassis having means for supporting a tank of standard diameter and having its longitudinal axis disposed lengthwise of said chassis, and provided at the ends of the tank with inclosed cargo compartments, and foot-ways formed on opposite sides of the tank and communicating with a foot-way supported by the roofs of the supplemental cargo compartments.

9. A freight car construction including a chassis having means for supporting a tank, and provided at the ends of the tank with inclosed cargo compartments, and foot-ways formed on opposite sides of the tank, other foot-ways formed on the roofs of the cargo compartments and at a higher level than the said foot-ways on the cargo compartments, and communicating transverse foot-ways for connecting the foot-ways on the tank and the compartments.

10. A freight car construction comprising in combination a chassis having the usual truck frames, a tank of standard diameter and having its longitudinal axis disposed lengthwise of said chassis having the bottom sides thereof inclined upwardly to clear said truck frames, and box car compartments at each end of the tank.

11. A freight car construction comprising in combination a chassis having the usual truck frames, box car compartments at the ends of the chassis and overlying a part of said truck frames, and a tank located between said box car compartments and having the bottom ends thereof formed to clear a portion of the truck frames.

12. A freight car construction, including the wheeled chassis, a tank arranged longitudinally of the chassis and occupying an intermediate part thereof, said tank having reinforced end walls, and enclosed cargo compartments built on to the end portions of the chassis beyond the ends of the tank and forming longitudinal extensions thereof, the inner ends of the cargo compartments abutting and joined to the reinforced end walls of the tank.

In testimony whereof I hereunto affix my signature.

LEWIS J. SPENCE.